United States Patent Office 3,299,155
Patented Jan. 17, 1967

3,299,155
OXIDATIVE DEHYDROGENATION OF ALKYL
BENZENES WITH CaNiPO₄ AND SO₂
Charles R. Adams, Oakland, Calif., assignor to Shell Oil
Company, New York, N.Y., a corporation of Delaware
No Drawing. Filed Feb. 24, 1964, Ser. No. 347,058
10 Claims. (Cl. 260—669)

This invention relates to an improved process for the production of vinyl and isopropenyl-substituted benzenes from corresponding alkyl-substituted benzenes. The invention relates more particularly to an improved process for the production of styrene and alpha-methyl styrene from ethyl benzene and isopropyl benzene respectively.

Vinyl and isopropenyl substituted benzenes have become of increasing importance in a wide field of practical application including, for example, the production of resins, plastics, synthetic rubber, solvents, chemical derivatives, etc. Their availability in quantity at relatively low cost is therefore highly desirable in the industry. Methods for their production disclosed heretofore comprise the controlled partial dehydrogenation of corresponding alkyl benzenes. As disclosed heretofore, these methods are often handicapped by disadvantages militating materially against their practical application. The desired compounds are often attained therein with only relatively low yields, thereby necessitating the recycling of unusually large quantities of unconverted charge. Many thereof are dependent upon the presence of a substantial excess of steam, and often additional gaseous diluents, which add to the cost of operation as a result of the exceedingly large volumes of additional materials recycled. In addition thereto, those processes relying upon the use of uncombined oxygen, or compounds yielding uncombined oxygen in situ, as an essential component of the charge generally produce a relatively large proportion of by-products comprising oxides of carbon, which reduce still further the yield of desired substituted benzenes and materially increases the cost thereof.

It is therefore an object of the present invention to provide an improved process enabling the more efficient production of vinyl and isopropenyl benzenes wherein the above difficulties are obviated to at least a substantial degree.

A particular object of the invention is the provision of an improved process enabling the more efficient production of styrene from ethyl benzene.

In accordance with the process of the invention, alkylene substituted benzenes, selected from the group consisting of benzenes and methyl-substituted benzenes having at least one alkylene radical of the group consisting of vinyl and isopropenyl radicals directly attached to the benzene nucleus, are produced by contacting an alkyl-substituted benzene, selected from the group consisting of benzene and methyl-substituted benzenes having at least one alkyl radical selected from the group consisting of ethyl and isopropyl directly attached to the benzene nucleus in admixture with sulfur dioxide, in vapor phase, at a temperature of from about 300 to about 700° C. with a metal phosphate catalyst.

The suitable alkyl-substituted benzenes used as charge to the process of the invention comprise those consisting essentially of a benzene ring having at least one ethyl and/or isopropyl group directly attached to the benzene nucleus. In addition to the ethyl and/or isopropyl substituents, the suitable alkyl benzenes may comprise one or more methyl groups directly attached to a carbon atom in the benzene ring. Examples of suitable alkyl benzenes employed as charge to the process of the invention comprise, for example, ethyl benzene, isopropyl benzene (cumene), ethyl-substituted toluene, isopropyl-substituted toluene, diethyl benzene, di-isopropyl benzene, 1,2-di-isopropyl-3-methyl benzene, etc. Mixtures of one or more of the above-suitable alkyl benzenes may be employed, thus a suitable charge comprises mixtures of isomeric diethyl benzenes, such as a mixture of meta- and para-diethyl benzene, or mixtures of isomeric di-isopropyl benzenes. The alkyl-substituted benzenes may be obtained from any suitable source. They need not necessarily be pure and may contain minor amounts of hydrocarbons which are inert or do not adversely affect the reaction, such as paraffins and/or olefinic hydrocarbons of the types generally found in commercially available alkyl benzenes. Suitable alkyl benzenes comprise the ethyl-substituted and isopropyl-substituted benzenes obtained by conventional alkylation and/or dealkylation processes.

The alkyl benzene charge may be subjected to suitable conventional pretreatment to effect the removal of undesired components comprising impurities therefrom. This may comprise clay treatment, acid treatment, contact with alkaline materials, ion exchange resins, etc. In accordance with the process of the invention, reaction of the alkyl-substituted benzene with sulfur dioxide is carried out in the presence of a catalyst consisting essentially of a metal phosphate. Although metal phosphates broadly constitute a suitable class of catalysts, the members of this broad class are not necessarily equivalent with respect to their effectiveness. Preferred catalysts comprise phosphates of the metals of Groups II-A, III-A, V-A, and VIII. Suitable catalysts of this preferred subclass comprise, for example, a phosphate of at least one member of the group consisting of calcium, indium, bismuth, chromium, tungsten, iron, cobalt, and nickel. Two or more of the metal phosphates in combination may be employed as catalyst. Catalysts comprising two or more of these metals may contain them as physical admixtures of their phosphates, or they may comprise the metals in chemical combination with phosphorus and oxygen to form a chemical compound, complex, or composition. Particularly preferred catalysts comprise those containing a phosphate of an alkaline earth metal, such as, for example, calcium phosphate, and those comprising an alkaline earth metal in chemical combination with a Group VIII metal, phosphorus and oxygen, as, for example, calcium-nickel-phosphate.

The metal phosphates above defined may be used as such or in combination with a suitable solid support or diluent material, for example, the aluminous and/or silicious catalyst support materials, such as the aluminas, silica-alumina, silica gel, etc. Other suitable support materials comprise, for example, silicon carbide, corundum, clays, and the like.

The catalyst may be employed in the form of a stationary bed positioned in a suitable reaction zone providing for intimate contact between reactants and catalyst. Suitable reaction zones may comprise one or more chambers of enlarged cross-sectional area, reaction zones of restricted cross-sectional areas, such as, for example, tubular reactors, or combinations thereof. The process furthermore lends itself to execution with the catalyst in the form of a fluidized bed or in the suspended state.

The sulfur dioxide reactant employed in the process of the invention may be obtained from any suitable source. The reaction is preferably carried out in the presence of an amount of sulfur dioxide at least equal to, and preferably exceeding, the molar amount of alkyl-substituted benzene reactant. In a preferred method of carrying out the invention, the molar ratio of sulfur dioxide to hydrocarbon charge to the reaction is maintained in the range of from about 1:1 to about 2:1. Although advantage resides in effecting the reaction within this defined preferred range of sulfur dioxide to alkyl benzene reactant, higher or lower ratios of the reactants may be used within the scope of the invention. Thus, mol ratios of sulfur dioxide to alkyl benzene component in the range of from about 0.5:1 to about 10:1 and higher may be employed within the scope of the invention. The sulfur dioxide component may at times be employed in a manner functioning additionally as an entraining agent. When used as such, the higher ratios of sulfur dioxide to the alkyl benzene component are preferably employed. When employing the catalyst in the form of fluidized bed or in the suspended form, the sulfur dioxide may be employed as the fluidizing, suspending, or entraining medium. It is to be stressed that essential to the obtaining of the objects of the inventions is the presence of the sulfur dioxide, other oxides of sulfur such as, for example, sulfur trioxide being unsuited.

Reaction of the sulfur dioxide with the alkyl benzene is effected in the vapor state at a temperature in the range of, for example, from about 300 to about 700° C., and preferably in the range of from about 400 to about 650° C. The temperature range of from about 450 to about 600° C. is particularly preferred. The reactants charged to the process of the invention may be preheated prior to and introduction into the reaction zone. The alkyl benzene and the sulfur dioxide components of the charge may be preheated separately and introduced into the reaction zone as a single combined stream or as separate streams. A part of the reactants may be injected into the reaction zone at one or more points along the length thereof.

The pressure employed is generally not critical. Thus, the invention may be executed at subatmospheric, atmospheric, or superatmospheric pressure. In general, it is preferred to maintain a pressure sufficiently high to facilitate circulation of materials through the system. A particularly desirable pressure range comprises, for example, from about atmospheric to about 350 p.s.i.g.

The space velocity employed may vary considerably within the scope of the invention in accordance with the type of catalyst bed employed and other operating conditions used, as well as the specific alkyl-substituted benzene being converted. The process of the invention generally enables the use of relatively high space velocities. The gaseous hourly space velocity, GHSV, as used herein is defined as the total volume of gaseous charge to the reaction zone of the process, calculated under standard conditions, passed per hour, per unit volume of catalyst bed. A gas hourly space velocity in excess of about 1,000 and generally up to about 4,000 is generally satisfactory. Higher or lower space velocities, for example, from about 10,000 and higher, may be used within the scope of the invention. The space velocity may be varied to control the severity of reaction conditions and consequent extent to which the alkyl benzenes are converted.

Under the above-defined conditions, the alkyl benzenes charged to the process of the invention are converted to the corresponding alkylene-substituted benzenes and/or methyl benzenes. Thus, ethyl benzene is converted to styrene, isopropyl benzene to alpha-methyl styrene, diethyl benzene to divinyl benzene and/or ethyl-vinyl benzene, diisopropyl benzene to di-alphamethyl styrene and/or isopropyl alpha-methyl styrene, etc. The process of the invention may be applied with advantage to the production of meta- and/or para-divinyl benzene from the corresponding meta- and/or para-diethyl benzene.

As stated above, the alkyl benzenes having more than 1 ethyl and/or isopropyl substituent group will result in reaction products comprising corresponding substituted benzenes wherein all or only part of the side chains have been dehydrogenated to the vinyl and/or methyl-substituted vinyl group. Thus, diethyl benzene will be converted to products comprising ethyl-vinyl benzene and divinyl benzene. Product distribution can be controlled by controlling the activity and/or the temperature of reaction employed. When the catalyst is employed in a relatively high state of activity, the products obtained when charging diethyl benzene will generally consist solely of, or predominantly of, divinyl benzene. When the catalyst is modified to reduce its activity, the products will comprise increasing amounts of ethyl-vinyl benzene, generally in direct ratio to the degree to which the catalyst activity has been modified. In a preferred method of modifying the activity of the catalyst, the catalyst is subjected to an elevated temperature, for example, in the range of from about 500 to 700° in an atmosphere comprising hydrocarbons and sulfur dioxide. The hydrocarbons employed may suitably comprise alkyl benzenes. It will be apparent that catalysts at least partially spent in the conversion of diethyl benzene to divinyl benzene may be employed in the production of ethyl-vinyl benzenes from the same charge. The catalyst activity may be modified by employing relatively low reaction temperatures during the process. Suitable temperatures comprise the lower temperatures in the above-defined temperature range.

As indicated above, conditions preferably employed within the broad range defined herein will vary to some extent with the specific alkyl benzene charged. Thus, the isomeric forms of diethyl benzene will not all undergo equivalent behavior under equal conditions. The meta- and para-diethyl benzenes, and mixtures thereof, generally result in the production of products consisting essentially of divinyl benzene, ethyl-vinyl benzene, and/or mixtures thereof. Reaction of these products generally does not proceed further without subjecting them to more prolonged or more severe reaction conditions. When producing ortho-divinyl benzene from an ortho ethyl benzene charge, however, the resulting products will readily undergo further reaction with ring closure resulting in the production of naphthalene. By control of the reaction conditions employed, all or at least substantially all of the charge can be readily converted to naphthalene.

Reaction zone effluence is passed to suitable recovery means which may comprise one or more such steps as distillation, extractive distillation, absorption, adsorption extractive distillation, and the like. Unconverted alkyl benzenes or incompletely converted alkyl benzenes as well as residual sulfur dioxide is recycled in part, or entirety, to the reaction zone. During the course of the process, gaseous reaction products formed will include substantial amounts of hydrogen sulfide. The hydrogen sulfide produced may be separated and eliminated from the system or may be converted by conventional means to products comprising sulfur dioxide suitable for reuse in the reaction. Selective oxidation of the hydrogen sulfide in the presence of materials normally recycled within the process may be resorted to.

Normally gaseous hydrocarbons present in the reactor effluence emanating from such materials introduced into the reaction zone or produced during the course of reaction may be separated and subjected to hydrocarbon oxidizing conditions in the presence of sulfur and/or hydrogen sulfide, emanating from an outside source or obtained from within the system, to produce sulfur dioxide-containing gases suitable for recycling to the reaction zone. It is to be noted that when resorting to such expedients, care is taken to avoid the passage of any substantial amounts of free oxygen and/or sulfur trioxide to the reaction zone. During the course of the process, the activity of the catalyst will decline progressively as a consequence of deposition of carbonaceous materials thereon. Such deposits may be removed therefrom by contact with oxygen or an oxygen-containing gas at an elevated temperature, thereby burning off the carbonaceous deposits. Such reactivation of the catalyst may be effected at temperatures in the range of from about 400 to about 800° C. It is preferred to sweep the reactivated catalyst with sulfur dioxide or sulfur dioxide-containing gas before its reuse in the process.

The following examples are illustrative of the presently claimed invention. Results indicated in the following examples are based upon analysis of the products obtained by mass spectroscopy.

In a plurality of separate operations (Runs 1–8) styrene was produced by passing a gaseous mixture consisting of ethyl benzene, sulfur dioxide, and helium through a bed of metal phosphate catalyst. The helium component of the charge is employed merely as inert diluent. The specific metal phosphate catalyst and the reaction conditions employed are set forth in the following Table I. Also included in Table I are the results obtained for each of the separate operations in terms of conversion of ethyl benzene charged and the selectivity to styrene.

and helium through a bed of calcium phosphate at a temperature of 510° C. and a total gas hourly space velocity of 3100. The partial pressure of diethyl benzenes and sulfur dioxide in the gaseous charge were 0.04 and 0.48, respectively; the rest of the charge consisting of inert helium diluent. There was obtained a diethyl benzene conversion of 94% with a selectivity to naphthalene of 78%, a selectivity to divinyl benzene of 3%, and a selectivity to ethyl vinyl benzene of 2%.

*Example VI*

Ethyl-vinyl benzene was produced by passing a gaseous mixture consisting of ortho-diethyl benzene, sulfur dioxide and helium through a bed of calcium phosphate at a temperature of 555° C. and a total gas hourly space velocity of 10,400. The partial pressures of diethyl benzene and $SO_2$ in the gaseous charge were 0.05 and 0.32 atmosphere,

TABLE I

| Run | Catalyst | Temp., °C. | Total GHSV | Partial Pressure in atm. of Ethyl Benzene | Partial Pressure in atm. of $SO_2$ | Conversion, percent | Selectivity to Styrene, percent |
|---|---|---|---|---|---|---|---|
| 1 | $CaNiPO_4$ | 550 | 960 | 0.12 | 0.29 | 96 | 90 |
| 2 | $CaPO_4$ | 550 | 3,400 | 0.9 | 0.45 | 83 | 79 |
| 3 | $CrPO_4$ | 600 | 100 | 0.9 | 0.5 | 66 | 88 |
| 4 | $CoPO_4$ | 600 | 3,400 | 0.9 | 0.45 | 97 | 87 |
| 5 | $BiFePO_4$ | 550 | 1,700 | 0.9 | 0.45 | 92 | 92 |
| 6 | $BiPO_4$ | 600 | 1,700 | 0.9 | 0.45 | 93 | 85 |
| 7 | $VnPO_4$ | 600 | 700 | 0.9 | 0.45 | 93 | 73 |
| 8 | $InPO_4$ | 550 | 700 | 0.9 | 0.45 | 86 | 82 |

*Example II*

Alpha-methyl styrene was produced by passing a gaseous mixture consisting of isopropyl benzene (cumene) $SO_2$ and helium through a bed of calcium phosphate at a temperature of 500° C. and a total gas hourly space velocity of 2,800. The partial pressure of isopropyl benzene and of sulfur dioxide in the gaseous mixture charged was 0.15 and 0.42 atmosphere respectively. The rest of the gaseous charge consisted of helium. There was obtained an isopropyl benzene conversion of 63% with a selectivity to alpha-methyl styrene of 72%.

*Example III*

A mixture of meta- and para-divinyl benzenes was produced by passing a gaseous mixture consisting of equal molar amounts of meta- and para-diethyl benzene, sulfur dioxide and helium through a bed of calcium phosphate at a temperature of 500° C. and a total gas hourly space velocity of 3,500. The partial pressures of diethyl benzene and of sulfur dioxide were 0.15 and 0.42 atmosphere respectively. The rest of the charge consisted of helium. There was obtained a conversion of diethyl benzene of 88% with a selectivity to divinyl benzene of 62% and a selectivity to ethyl vinyl benzene of 18%.

*Example IV*

The operation of the foregoing Example III was repeated under substantially identical conditions but with the exception that the calcium phosphate catalyst employed had been partially deactivated by use in the reaction of diethyl benzene with $SO_2$ at 500° C. for a period of 40 minutes. With the use of such a partially deactivated catalyst, there was obtained a diethyl benzene conversion of 22% with a selectivity to divinyl benzene of 5% and a selectivity to ethyl vinyl benzene of 85%.

*Example V*

Naphthalene was produced by passing a gaseous mixture consisting of ortho-diethyl benzene, sulfur dioxide respectively. The rest of the charge consisted essentially of helium diluent. There was obtained a conversion of diethyl benzene of 26% with a selectivity to ethyl vinyl benzene of 72%, a selectivity to ortho-divinyl benzene of 8%, and a selectivity to naphthalene of 18%.

I claim as my invention:

1. The process for the production of alkylene substituted benzenes selected from the group consisting of benzene and methyl substituted benzenes having at least one alkylene of the group consisting of vinyl and isopropenyl directly attached to the benzene nucleus which consists of contacting an alkyl-substituted benzene selected from the group consisting of benzene and methyl-substituted benzenes having at least one alkyl selected from the group consisting of ethyl and isopropyl directly attached to the benzene nucleus, in admixture with sulfur dioxide, in vapor phase, at a temperature of from about 300° to about 700° C., with a metal phosphate catalyst.

2. The process in accordance with claim 1 wherein said metal phosphate is an alkaline earth metal phosphate.

3. The process in accordance with claim 1 wherein said metal phosphate is calcium phosphate.

4. The process in accordance with claim 1 wherein said metal phosphate is calcium nickel phosphate.

5. The process for the production of a vinyl-substituted benzene which consists essentially of contacting an ethyl-substituted benzene in admixture with sulfur dioxide, in vapor phase, at a temperature of from about 500° C. to about 600° C., with a metal phosphate.

6. The process for the production of styrene which consists essentially of contacting ethyl benzene, in admixture with sulfur dioxide in vapor phase at a temperature of from about 500° C. to about 600° C., with a catalyst consisting essentially of calcium phosphate.

7. The process in accordance with claim 6 wherein said catalyst is calcium nickel phosphate.

8. The process in accordance with claim 6 wherein said catalyst is indium phosphate.

9. The process for the production of alpha-methyl styrene which consists essentially of contacting isopropyl benzene, in admixture with sulfur dioxide, in vapor phase, at a temperature of from about 500° C. to about 600° C., with a catalyst consisting essentially of calcium phosphate.

10. The process for the production of divinyl benzene which consists essentially of contacting diethyl benzene, in admixture with sulfur dioxide, in vapor phase, at a temperature of from about 500° C. to about 600° C., with a catalyst consisting essentially of calcium phosphate.

References Cited by the Examiner

UNITED STATES PATENTS

| 2,423,418 | 7/1947 | Stone et al. | 260—680 |
| 2,909,573 | 10/1959 | Soderquist et al. | 260—669 |
| 2,945,900 | 7/1960 | Alexander et al. | 260—680 X |

DELBERT E. GANTZ, *Primary Examiner.*

C. R. DAVIS, *Assistant Examiner.*